April 5, 1960
G. O. PAROW
2,931,959
RECTIFIER ASSEMBLIES
Filed Nov. 5, 1956
4 Sheets-Sheet 1
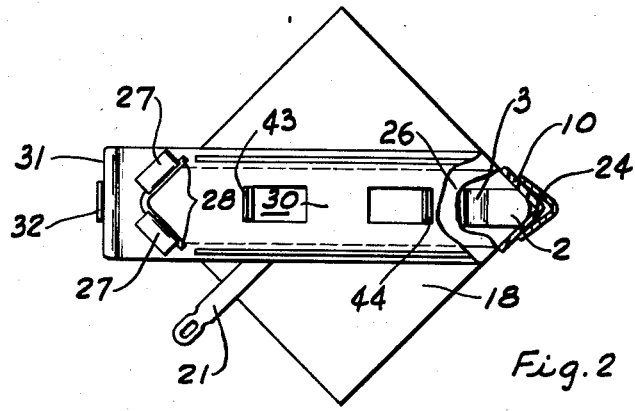
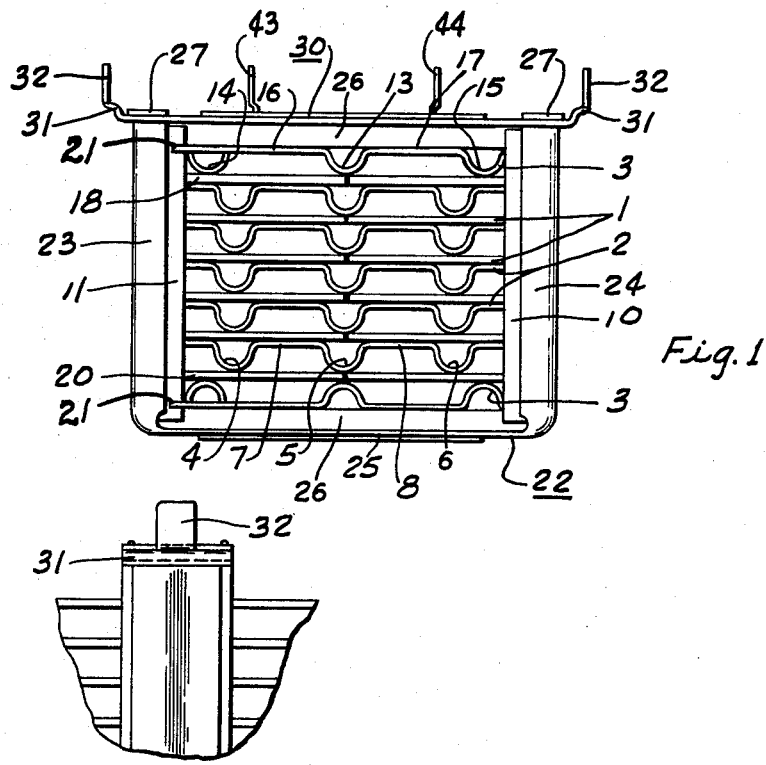
INVENTOR.
GÜNTER O. PAROW
BY
HIS ATTORNEY April 5, 1960

G. O. PAROW 2,931,959

RECTIFIER ASSEMBLIES

Filed Nov. 5, 1956

INVENTOR.
GÜNTER O. PAROW
BY
William D. Carothers
HIS ATTORNEY

April 5, 1960      G. O. PAROW      2,931,959
RECTIFIER ASSEMBLIES

Filed Nov. 5, 1956      4 Sheets-Sheet 3

INVENTOR.
GÜNTER O. PAROW
BY
*William D. Carothers*
HIS ATTORNEY

April 5, 1960 G. O. PAROW 2,931,959
RECTIFIER ASSEMBLIES
Filed Nov. 5, 1956 4 Sheets-Sheet 4

INVENTOR.
GÜNTER O. PAROW
BY
HIS ATTORNEY

United States Patent Office 2,931,959
Patented Apr. 5, 1960

2,931,959

RECTIFIER ASSEMBLIES

Günter O. Parow, Aldershot, Ontario, Canada, assignor to Syntron Company, Homer City, Pa., a corporation of Delaware Application November 5, 1956, Serial No. 620,278

10 Claims. (Cl. 317—234)

This invention relates generally to rectifier assemblies and more particularly to the configuration and shape of the frame that embraces the rectifier stack.

Disc type rectifiers, whether they be square, rectangular or polygon and round in shape have had many different forms of assembly members to hold the stack in proper centered relation and under sufficient pressure to maintain electric contact between the elements making up the rectifier stack. Some of the new forms of rectifier stacks have some form of U-shaped insulating member which is constructed of plastic material, such as neutral or synthetic rubber, or other plastic material that is capable of providing sufficient insulation of the stack and sufficiently strong to hold the stack discs together.

The principal object of this invention is the provision of an encircling frame on the rectifier stack which is constructed of strap material that may be fed from a roll such as flattened wire or it may be preformed by having the flat material preshaped into the form that would embrace the rectifier. Thus each of the metal parts of the strap may be a punching or formed structure that may be preformed before the assembly or formed during the assembly of the rectifier. The insulating means is merely an insert of an insulating cloth or fish paper for the purpose of maintaining the spacing and insulate the discs from the supporting frame.

Another object is the provision of a novel strap for encircling and applying pressure to a rectifier stack which is very readily applied and is economical to manufacture and at the same time provides a superior product even though less expensive than other forms of rectifier stacks.

Other objects and advantages appear hereinafter in the following description and claims.

The accompanying drawings show for the purpose of exemplification without limiting this invention or the claims thereto certain practical embodiments illustrating the principles of this invention wherein:

Fig. 1 is a view in side elevation of the rectifier assembly comprising this invention.

Fig. 2 is a top plan view of the structure shown in Fig. 1.

Fig. 3 is a view in end elevation of the structure illustrated in Figs. 1 and 2.

Figure 5:
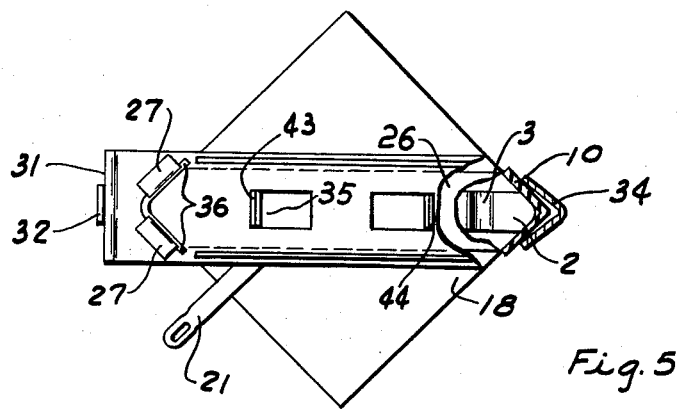
Fig. 5 is a top plan view of the structure shown in Fig. 4.

Referring to Figs. 1 to 3, the rectifier stack comprises a series of rectifier discs 1 which are separated by the conducting spring elements 2 and with the terminal elements at the opposite end of the stack as indicated at 3. The terminal elements are ordinarily made of heavier metal than that of the spring members so as to provide a greater stiffness at the opposite ends of the stack.

Each of the spring elements comprises a strap that is formed with three short bends indicated at 4, 5 and 6. The short bends have interposed therebetween the longer bends 7 and 8. However when placed in a rectifier these spring elements are usually assembled so that the short bends all face in the same direction. The ends of the spring element extend to the insulation members 10 and 11 at opposite ends of the stack. In the structure as shown in Figs. 1 to 3 the spring members extend diagonally across from opposite corners of the square shaped discs. However these discs may be of any desired shape, such as round, rectangular, octagonal or any suitable shape. The shape does not in any way change the method and structure of the means for encircling and assembling the rectifier. As shown in these views the opposite corners of the discs are fitted into the insulating members 10 and 11 which are shaped angular to fit the corners. Thus the rectifiers and the intermediate spring elements 2, together with the terminal elements 3, all fit in the opposed insulating sections.

The terminal elements 3 likewise have three short bends with a center short bend 13 and two end short bends 14 and 15. However, intermediate these bends are the long bends indicated at 16 and 17. The outermost short bends 14 and 15 are preferably extended beyond the short bends 4 and 6, which represent the outermost bends of the spring members, and since the spring members 2 are of lighter gauge and have the bearing of their short bends inwardly of the short bends 14 and 15 of the terminal members, the ends of the first and last discs 18 and 20 of the stack are flexed toward each other owing to the pressure that is placed on this assembly.

By requiring that the rectifier discs 18 and 20 flex one has a visual check to determine whether or not there is sufficient pressure on the assembly to properly maintain the contact between each of the rectifier discs, the contacting springs and the terminal members.

Each of the contact members 3 is provided with an outwardly extending lateral contact member which is formed integral therewith and is indicated at 21, which may be provided with a suitable opening for soldering a lead thereto. As illustrated in Fig. 2, the terminal 21 extends laterally so as to position it substantially in the center of the square disc. The stack shown is that of a half wave rectifier wherein there are no intermediate terminals. However terminals could be placed intermediate of the stack to form a full wave rectifier, which is well known in the art. In this case the terminal members can be laid at opposite sides relative to each other so as to provide the A.C. terminals on one side and the D.C. terminals on the other.

The encircling frame as shown in Figs. 1 to 3 comprises the strap member 22, which in this instance has the leg members 23 and 24 that are preformed in angular cross section, and the flat bottom section 25. A heavy insulation plate 26 is laid on opposite sides of the terminal members 3. Each of these insulating members is heavier than the fish paper such as illustrated at 10 and 11 and their ends are shaped in a manner similar to that of the ends of the terminals and the ends of the springs. By making the insulation members 26 of thicker material one can permit the fish papers 10 and 11 to overlap so as to insure proper insulation at the joints between the two sections of insulating material.

The legs 23 and 24 are formed from the strap forming the embracing frame and the ends thereof project upwardly and are bent over as indicated at 27. These ends extend up through the slot 28 at the opposite ends of the spanning section 30. The spanning section 30 has an offset 31 at each end thereof and the ends then project upwardly as indicated at 32 to form a mounting tongue which may be bent over or otherwise secured to the apparatus to which the rectifier is being attached.

The ends 27 of the legs 23 and 24 are preferably split at the angle so that they form tabs that may be folded in opposite directions to overlap the same as shown in Fig. 2. These overlapped strap sections secure the stack under spring pressure.

The spanning member 30 is pressed into place and the ends 27 are cut sufficiently down the legs 23 and 24 so as to provide pressure on each of the spring members in the assembly when the ends 27 are bent over in place. After they have been bent over in place the structure maintains this assembly under the spring pressure. The device may be utilized with or without painting. However when the same is painted each of the members is formed rigid relative to each other.

Figure 4:
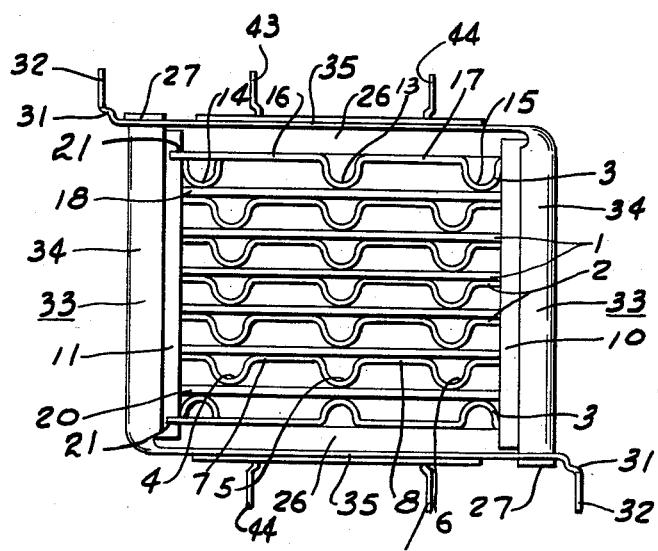
Fig. 4 is a view in side elevation of a rectifier assembly with the clamping strap in two similar parts.

The structure shown in Figs. 4 and 5 illustrates a frame made of two sections 33 which are identical to each other. Each section has a leg 34 which is angular in cross section and a strap, base, or spanning member 35, which is formed integral with the leg, and the end of the strap is provided with openings 36 to receive the bent over ends 27 as previously described. The free end of the strap 35 has the offset 31 and the tongue 32 for mounting. Here the mounting members are at diagonally opposite ends of the stack, whereas in the structure of Figs. 1 to 3 the mounting members are on the same end of the stack. Otherwise the structure of the stack is the same and as illustrated in Figs. 2 and 5 the angle of the legs 23 and 24 is approximately 78°, which is an acute angle less than a 90° relation of the corner of the rectifiers and also the formation of the insulating material 10 and 11. This insures that each of the rectifier discs together with the spring members are properly centered relative to the apex of the angle formed by the leg members. Each of the spring members together with the terminal members has the same character of ends and fits into the insulating material in the same way as shown in Figs. 2 and 5. Otherwise the structures of Figs. 4 and 5 are identical with that of Figs. 1 and 3. Here only one section of the frame need be constructed as it is a duplicate for both sides, making the device more economical.

Figure 7:
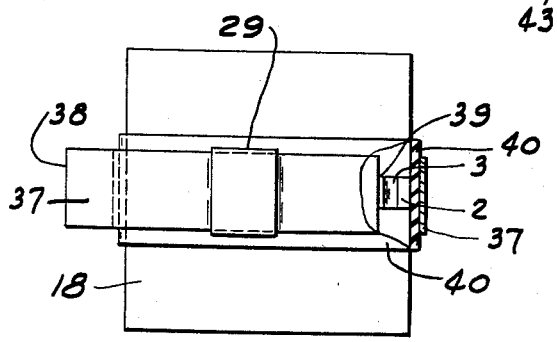
Fig. 7 is a top plan view of the structure shown in Fig. 6.
Figure 6:
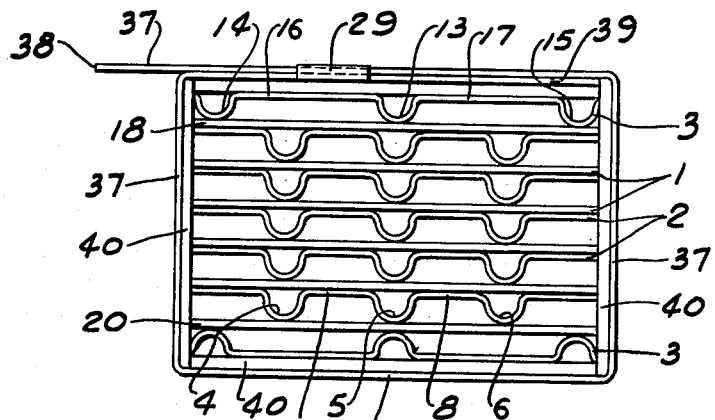
Fig. 6 is a view in side elevation of a rectifier assembly with a single encircling strap on the flat sides of the disc.

Referring now to Figs. 6 and 7, it will be noted that the frame is placed not across the corners of the rectifier discs 18 and 20 but is around the middle of these discs, and each of the terminal members, the spring members and the insulating members are likewise cut to the proper length to extend across the width of a rectifier, which in this instance is square in shape. Thus the terminal members 3 and the spring members 2 have flat ends in the same rather than pointed ends owing to the fact that they reach the side of the rectifier rather than the corner. In any instance of each of the showings these members should be shaped on their ends in the same manner as the legs. In this case it will be observed that the legs are flat, in fact the whole frame consists of a steel strap which encircles the rectifier and is pulled up taut and crimped, such as indicated at 29, to hold the strap member 37 in position. This type of crimping machine is similar to that commonly employed for fastening packages for shipment. However in place of using a band such as employed in the instances which are believed to be a spring type steel band, the straps here are preferably coated with a galvanizing or other form of coating, or they may be made of aluminum, or aluminum alloy material as will withstand considerable stretching and a tensile strength. The end of the strap as indicated at 38 is employed to mount the rectifier and the other end 39 is underneath and is employed merely to continue the spacing along the one end of the rectifier. Here the insulating members 40 are the same all the way around the stack. Each insulating member 40 is equal to the dimension of the stack plus one thickness of the insulating member of the next consecutive one, so that each consecutive insulating member may overlap the thickness of one insulating member at one end and thereby maintain proper clearance between each of the members and the strap. As shown in Fig. 7, the insulating member is preferably wider than the strap members. Although the strap encircling the rectifier stack is preferably metal, it might well be a flexible strap made from material such as nylon or glass cloth which when having its legs shaped to form the abutments that hold the rectifier discs in similar position may be impregnated with a plastic that causes the legs to provide continuous spaced abutments to engage the opposite edges of the disc corners. A cross section of these legs may be angular or circular so long as they provide the continuous spaced abutments.

Figure 8:
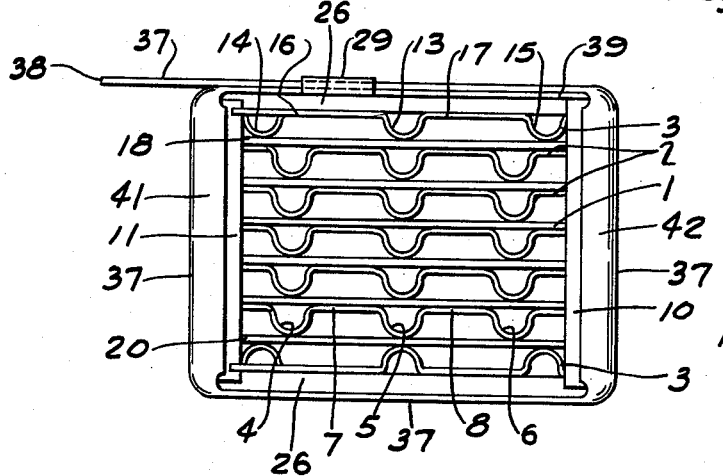
Fig. 8 is a view in side elevation of a rectifier assembly with a single encircling strap on the opposite corners of the disc.
Figure 9:
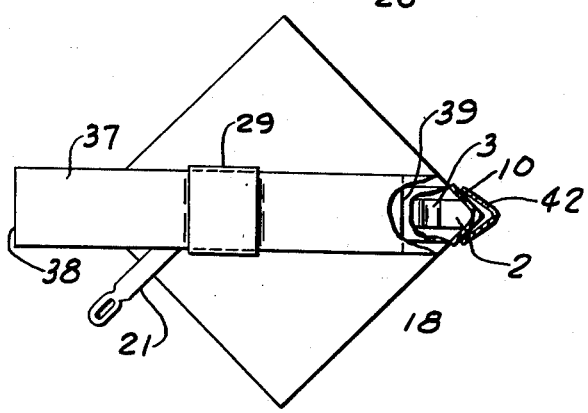
Fig. 9 is a top plan view of the structure shown in Fig. 8.

The structure shown in Figs. 8 and 9 is similar to that of the structure shown in Figs. 6 and 7, other than the fact that the strap is placed at the corners in a manner similar to Figs. 1 to 5. Here the strap member is one continuous piece and when it is placed around the rectifier discs it is placed on opposite corners and when the same is drawn taut and clamped, such as illustrated at 29, the leg sections 41 and 42 are bent inwardly by a jig, as illustrated, so as to have the same general configuration of the structure as illustrated in Figs. 1 to 5. However the stack is made in the same manner and the insulation is applied in the same way and the strap is placed around the assembled stack and drawn taut and clamped at the same time that the ends of the sides of the legs 41 and 42 are bent inwardly to form the angular cross section, as illustrated in Fig. 9.

Mounting tongues as at 43 and 44 in Fig. 4 may be struck from the base member 25 with the spanning member 30 on the structure shown in Fig. 1 or in the bridging sections 35 as shown in Fig. 4 or in the top and bottom sections of the strap 37 as shown in Figs. 6 and 8. The bridging sections passing between the legs on the top and bottom of the rectifier may be corrugated to stiffen the same when needed.

Referring to Figs. 10 to 13 the rectifier assembly is held by the strap member 22 which is the same as that illustrated in Fig. 1 and comprises the V-shaped leg members 23 and 24 which are less than 90° in order to make sure that the sharp corner of the rectifier plate 18 does not penetrate the insulation 10 and ground the rectifier on either of the legs 23 or 24. The bottom or base section 25 of the strap member 23 has the mounting tongues 43 and 44 struck therefrom and these tongues lie between the stiffening ribs 45. The spanning member 30 likewise has the stiffening ribs 45 and its opposite ends are turned up to form the mounting tongues 32.

Figure 11:
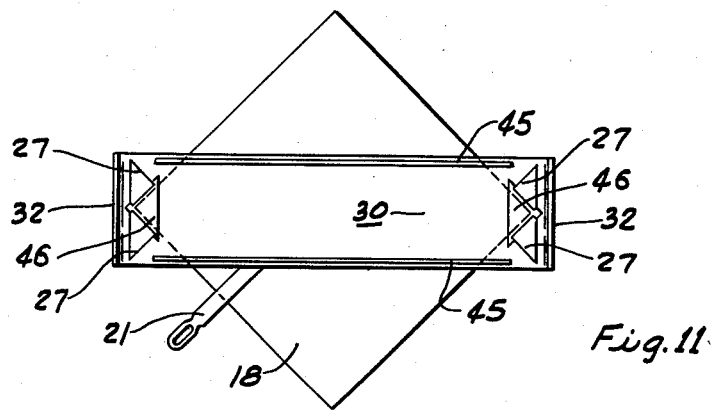
Fig. 11 is a top plan view of the structure shown in Fig. 10.
Figure 10:
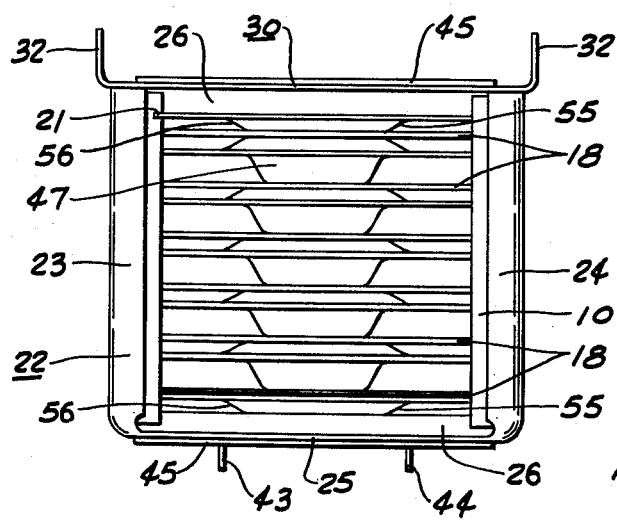
Fig. 10 is a view in side elevation of a rectifier assembly having pan-shaped spring elements.

As shown in Fig. 11 the spanning member 30 is not provided with the slots 28 but the whole of the triangular section 46 is cut out to permit the ends of the legs 23 and 24 as indicated at 27 to protrude therethrough and hold the rectifier stack in assembled position.

Figure 12:
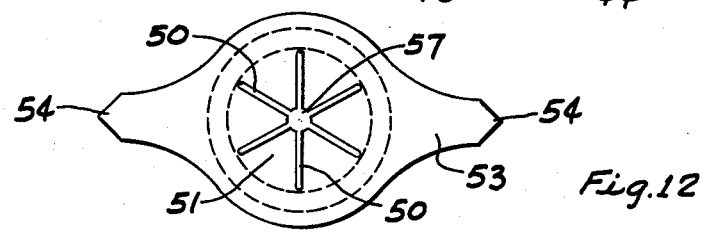
Fig. 12 is a top plan view of the spring element employed in Fig. 10.
Figure 13:
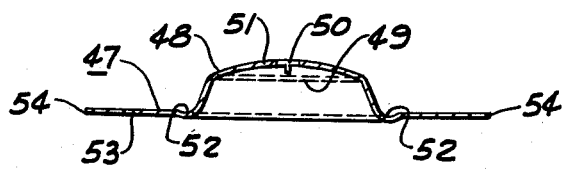
Fig. 13 is a view in section of the spring element shown in Fig. 12.

Each of the rectifier discs 18 are separated by the spring elements 47 which are shown in detail in Figs. 12 and 13 and comprises the metal member formed in a vault or dome shape such as illustrated at 48, the upper portion of which is arcuate so as to produce a definite chord as illustrated by the dotted lines at 49. The top of the dome which is circular is cut by means of the three transverse slots 50 so as to leave the six pie-shaped leaf sections 51. The very center of the dome being cut in the form of a circle such as indicated at 57 by reason of the transverse slots 50. Thus each of the pie-shaped sectors 51 are arcuate as illustrated in Fig. 13 and provide a spring contact against the rectifier disc.

The bottom of the dome-shaped member 48 is provided with a reverse curve 52 which spaces the laterally extending arms 53 above the next adjacent rectifier disc. The ends of the arms are pointed as illustrated at 54 so as to be inserted in the insulation 10 that is held in an angle less than 90° by the angle of the legs 23 and 24. The terminal members 55 are provided with an intermediate offset portion 56 in place of the three bends as illustrated in the structure of Fig. 1.

Either the top of the vault or dome or the bottom reverse curved portion 52 may be employed as a contact member on either side of the rectifier disc. That is, if the disc is a selenium rectifier or an aluminum, either the pie-shaped leaf member 51 or the reverse curve 52 may engage either the selenium or the aluminum surface in stacking the rectifiers.

After these rectifiers are assembled they are dipped in a suitable paint that not only coats the same but seals the same and functions as an additional holding agent of the assembly.

I claim:

1. A rectangular strap frame having insulated top and bottom and sides, a stack of rectifier discs having their opposite edges engaging said insulated sides, a spring element in current contacting engagement between adjacent rectifier discs, said spring element having a resilient vault with sloping sides ending in a reverse curve of laterally extending arms engaging said insulated sides in spaced relation from said rectifier discs and locking means holding the top, bottom and sides of the strap frame to compress said resilient vault spring elements.

2. The structure of claim 1 characterized in that the top and bottom sections of said frame are ribbed and flat and the sides have an acute angular cross section.

3. The structure of claim 1 characterized in that the vault and reverse curves of said spring elements are annular and said sloping sides are frusto conical.

4. The structure of claim 1 characterized in that the vaults of said spring elements are slotted to provide arcuately shaped leaves.

5. A rectifier assembly that comprises a stack of rectifier discs separated by conducting spacer elements, with terminal members connected to the spacers, the discs being of angular form at diagonally-opposite corners, a frame of strap-like members encircling the stack and having two longitudinally-extending angularly-recessed areas that receive said diagonal corners, the said angular areas being of smaller angularity than the angles of said corners, whereby the discs are held in alinement, but with their said corners out of engagement with the apices of said angular areas, and insulation between the strap and the discs and spacers.

6. An assembly as recited in claim 5, wherein the spacers also extend into the angular areas and the said insulation includes angular strips interposed between the said angular areas and the discs and spacers.

7. A rectifier assembly that comprises a stack of rectifier discs that are separated by spacer elements, a strap-like frame encircling the stack formed by the discs and the spacers, and the strap portions spanning the ends of the stack being of generally flattened shape and having a mounting tongue struck outwardly therefrom.

8. An assembly as recited in claim 7, wherein each said flattened area has a longitudinal stiffening rib pressed therefrom.

9. A rectifier assembly that comprises a stack of rectifier discs separated by conducting spacer elements, terminal members connected to the upper and lower elements, and a frame of strap-like members encircling the discs and the spacer elements and binding them in assembled relation, the spacer elements being of spring-like material and having alternately narrow and wide bends formed therein, the spacer elements at the top and bottom of the assembly having narrow bends set closer to two opposite edges thereof than are the bends on the intermediate spacers, and the ends of the discs next adjacent to the top and bottom spacers being flexible under pressure exerted by the frame against the top and bottom spring elements at said edges.

10. A rectifier assembly that comprises a stack of rectifier discs separated by conducting spacer elements, terminal members connected to the upper and lower elements, and a frame of strap-like members encircling the discs and the spacer elements and binding them in assembled relation, the spacer elements being of spring-like material and having convex areas that are deformable under pressure applied to the ends of the assembly, those portions of said areas nearest to the edges of the spacer elements being more resistant to flexure than the intermediate areas.

References Cited in the file of this patent

UNITED STATES PATENTS

| | | |
|---|---|---|
| 2,416,152 | Braun | Feb. 18, 1947 |
| 2,459,023 | Gilman | Jan. 11, 1949 |
| 2,485,599 | Halvorsen | Oct. 25, 1949 |
| 2,839,710 | Doucot | June 17, 1958 |